US011134450B2

(12) United States Patent
Noda

(10) Patent No.: US 11,134,450 B2
(45) Date of Patent: Sep. 28, 2021

(54) MOBILE TERMINAL, POSITION CONFIRMATION DEVICE, POSITION CONFIRMATION SYSTEM, POSITION SPECIFICATION PROGRAM, POSITION CONFIRMATION PROGRAM, POSITION SPECIFICATION METHOD AND POSITION CONFIRMATION METHOD

(71) Applicant: LAPIS Semiconductor CO., LTD., Yokohama (JP)

(72) Inventor: Mitsuhiko Noda, Yokohama (JP)

(73) Assignee: LAPIS Semiconductor CO., LTD., Yokohama (JP)

( * ) Notice: Subject to any disclaimer, the term of this patent is extended or adjusted under 35 U.S.C. 154(b) by 0 days.

(21) Appl. No.: 16/158,306

(22) Filed: Oct. 12, 2018

(65) Prior Publication Data

US 2019/0116561 A1 Apr. 18, 2019

(30) Foreign Application Priority Data

Oct. 13, 2017 (JP) .............................. JP2017-199145

(51) Int. Cl.
*H04W 52/24* (2009.01)
*G01S 19/05* (2010.01)
(Continued)

(52) U.S. Cl.
CPC ........... *H04W 52/245* (2013.01); *G01S 19/05* (2013.01); *H04W 52/0241* (2013.01);
(Continued)

(58) Field of Classification Search
CPC ........ G01S 19/14; G01S 5/0072; G01S 19/01; G01S 19/16; G01S 19/34; G01S 5/02;
(Continued)

(56) References Cited

U.S. PATENT DOCUMENTS

2008/0143516 A1\* 6/2008 Mock ................. G08B 13/1427
340/539.14
2013/0099920 A1\* 4/2013 Song .................... G08B 21/023
340/539.13
(Continued)

FOREIGN PATENT DOCUMENTS

JP 2004-357268 12/2004

*Primary Examiner* — Golam Sorowar
(74) *Attorney, Agent, or Firm* — JCIPRNET

(57) ABSTRACT

A position confirmation device is provided. The position confirmation device comprises: a registration portion, which registers event information comprising information of a place where an event is conducted; a setting portion, which sets a safety range capable of being specified as a position of a user during the event from the information of the place and a position specification accuracy of a first mode for specifying the position; an acquisition portion, which acquires position information relating to a position of a mobile terminal specified by the mobile terminal carried by the user; and a transmission portion, which transmits a switching instruction to the mobile terminal when the position indicated by the position information deviates from the safety range set by the setting portion, wherein the switching instruction instructs switching to a second mode for specifying the position by a greater power consumption and a higher accuracy than the first mode.

3 Claims, 8 Drawing Sheets

(51) Int. Cl.
   *H04W 52/02* (2009.01)
   *H04W 64/00* (2009.01)
   *H04W 60/04* (2009.01)
   *H04W 52/28* (2009.01)

(52) U.S. Cl.
   CPC ... *H04W 52/0245* (2013.01); *H04W 52/0274* (2013.01); *H04W 52/283* (2013.01); *H04W 60/04* (2013.01); *H04W 64/003* (2013.01)

(58) Field of Classification Search
   CPC ........ G01S 5/0294; G01S 5/14; H04W 24/04; H04W 4/021; H04W 4/029; H04W 4/30; H04W 4/33; H04W 4/70; H04W 4/90; H04W 52/0241; H04W 76/50; H04W 4/02; H04W 64/00; H04W 4/185; H04W 28/0226; H04W 4/026; H04W 4/14; H04W 24/00; H04W 4/027; H04W 48/16; H04W 4/023; H04W 4/025; H04W 52/0225; H04W 72/042; G06F 2221/2111; G06F 21/575; G06F 21/121; G06F 21/71; G06F 21/74; G06F 2221/034; G06F 2221/2105; G06F 2221/2141; G06F 16/70; G06F 3/011; G06F 3/04815; G06F 16/51; G06F 16/54; G06F 16/58; G06F 3/0481; G06F 3/14; G06F 9/451; G06F 21/35; G06F 2221/2101

See application file for complete search history.

(56) References Cited

U.S. PATENT DOCUMENTS

| | | | |
|---|---|---|---|
| 2014/0274225 A1* | 9/2014 | Lacatus | H04W 52/0241 455/574 |
| 2016/0094966 A1* | 3/2016 | Ledingham | H04W 4/70 455/404.2 |
| 2017/0006419 A1* | 1/2017 | Rajala | H04W 4/021 |

* cited by examiner

| Person | Yamada Taro | | |
|---|---|---|---|
| Name | Yamada Taro | Age | 80 |
| Address | 1-1, ○○ Town, ○○ City, ○○ Prefecture, 111-1111 | | |
| Telephone | 0123-45-6789 | | |
| Guardian | Yamada Taichi | | |
| Name | Yamada Taichi | Age | 40 |
| Address | 1-1, ○○ Town, ○○ City, ○○ Prefecture, 222-2222 | | |
| Telephone | 9876-54-3210 | | |
| Mail | yamada@xxyyzz.com | | |

| | | |
|---|---|---|
| Home | 1-1, ○○ Town, ○○ City, ○○ Prefecture, 111-1111 | Suburb |
| A Hospital | 10-10, ○○ Town, ○○ City, ○○ Prefecture, 111-1122 | Suburb |
| B Center | 30-1, ○○ Town, ○○ City, ○○ Prefecture, 111-3333 | City |
| | Zip code | — |

FIG. 7

Yamada Taro

July 1 Schedule

| Time | Event name | Place | Means of movement |
|---|---|---|---|
| 9:00~11:00 | Go to hospital | Home ↔ A Hospital | On foot |
| 12:00~18:00 | Day care | Home ↔ B Center | Vehicle |
| ~ | ~ | ↔ | |

FIG. 8

MOBILE TERMINAL, POSITION CONFIRMATION DEVICE, POSITION CONFIRMATION SYSTEM, POSITION SPECIFICATION PROGRAM, POSITION CONFIRMATION PROGRAM, POSITION SPECIFICATION METHOD AND POSITION CONFIRMATION METHOD

CROSS-REFERENCE TO RELATED APPLICATION

This application claims the priority benefit of Japan Application No. 2017-199145, filed on Oct. 13, 2017. The entirety of the above-mentioned patent application is hereby incorporated by reference herein and made a part of this specification.

BACKGROUND

Technical Field

The present disclosure relates to a mobile terminal, a position confirmation device, a position confirmation system, a position specification program, a position confirmation program, a position specification method and a position confirmation method.

Related Art

A technology, which specifies people's position by using a GPS (Global Positioning System) and a wireless technology, is known (for example, see Japanese Patent Application Laid-open No. 2004-357268 (patent literature 1)).

If the technology recited in patent literature 1 is used, a position of a wandering person can be specified, and the position can be notified to a guardian.

However, in the technology recited in patent literature 1, a mobile terminal carried by a person is provided with a GPS receiver, and detects a position all the time, so that power consumption of the mobile terminal is great. Accordingly, there is an occasion that a battery exhaustion of the mobile terminal occurs at a critical moment, and the position of the person cannot be specified. Particularly, in recent years, a mobile terminal, such as a smartphone, which has various functions besides a call function is common, and such a mobile terminal is considered to be combined with the above-described position specification function. In this kind of mobile terminal, because power is consumed in addition to the GPS receiver, it is desirable that the power consumption for the position specification function can be reduced.

SUMMARY

The present disclosure is accomplished in view of the above-described points, and aims to provide a mobile terminal, a position confirmation device, a position confirmation system, a position specification program, a position confirmation program, a position specification method and a position confirmation method, which can also specify position while reducing power consumption compared with an occasion when the position is specified only by a position specification method in which the power consumption is comparably great.

(1) The mobile terminal of the present disclosure includes: a reception portion, which receives a switching instruction instructing a switching of a first mode or a second mode, wherein the first mode is for specifying a position, and the second mode is for specifying the position by a greater power consumption and a higher accuracy than the first mode; and a specification portion, which specifies a position of itself by the first mode or the second mode according to the switching instruction received by the reception portion.

(2) The position confirmation device of the present disclosure includes: a registration portion, which registers event information including information of a place where an event is conducted; a setting portion, which sets a safety range capable of being specified as a position of a user during the event from the information of the place and a position specification accuracy of the first mode for specifying the position; an acquisition portion, which acquires position information relating to a position of a mobile terminal, wherein the position is specified with the first mode by the mobile terminal carried by the user; and a transmission portion, which transmits a switching instruction to the mobile terminal when the position indicated by the position information deviates from the safety range set by the setting portion, wherein the switching instruction instructs a switching to a second mode for specifying the position by a greater power consumption and a higher accuracy than the first mode.

(3) The position confirmation system of the present disclosure includes the mobile terminal in (1), and the position confirmation device in (2) or (3).

(4) The mobile terminal of the present disclosure includes: a registration portion, which registers event information including information of a place where an event is conducted; a setting portion, which sets a safety range capable of being specified as a position of a user during the event from the information of the place and a position specification accuracy of the first mode for specifying the position; and a specification portion, which specifies a position of itself by a first mode or a second mode that specifies the position by a greater power consumption and a higher accuracy than the first mode, and which continues to specify the position by the first mode when the position specified by the first mode is within the safety range set by the setting portion, and specifies the position by the second mode when the specified position deviates from the safety range.

BRIEF DESCRIPTION OF THE DRAWINGS

FIG. 7 is a diagram showing one example of an input screen of basic information.

FIG. 8 is a diagram showing one example of an input screen of an event.

DESCRIPTION OF THE EMBODIMENTS

In the position confirmation device, the registration portion further registers information relating to a contact destination for notification, and the transmission portion transmits, when the position indicated by the position information deviates from the safety range set by the setting portion, information that the user deviates from the safety range to the contact destination.

According to the present disclosure, the first mode and the second mode, which specifies the position by a greater power consumption and a higher accuracy than the first mode, are switched to be used, so that the power consumption can be reduced and the position can be specified, compared with the occasion when the position is specified only by the second mode.

Next, one example of embodiments of the present disclosure is described with reference to diagrams. Furthermore, in each diagram, the same or equivalent configuration components and parts are denoted by the same reference symbol. In addition, there is an occasion that dimensional ratios of the diagrams are exaggerated for convenience of description, and different from the actual ratios.

First Embodiment

Figure 1:
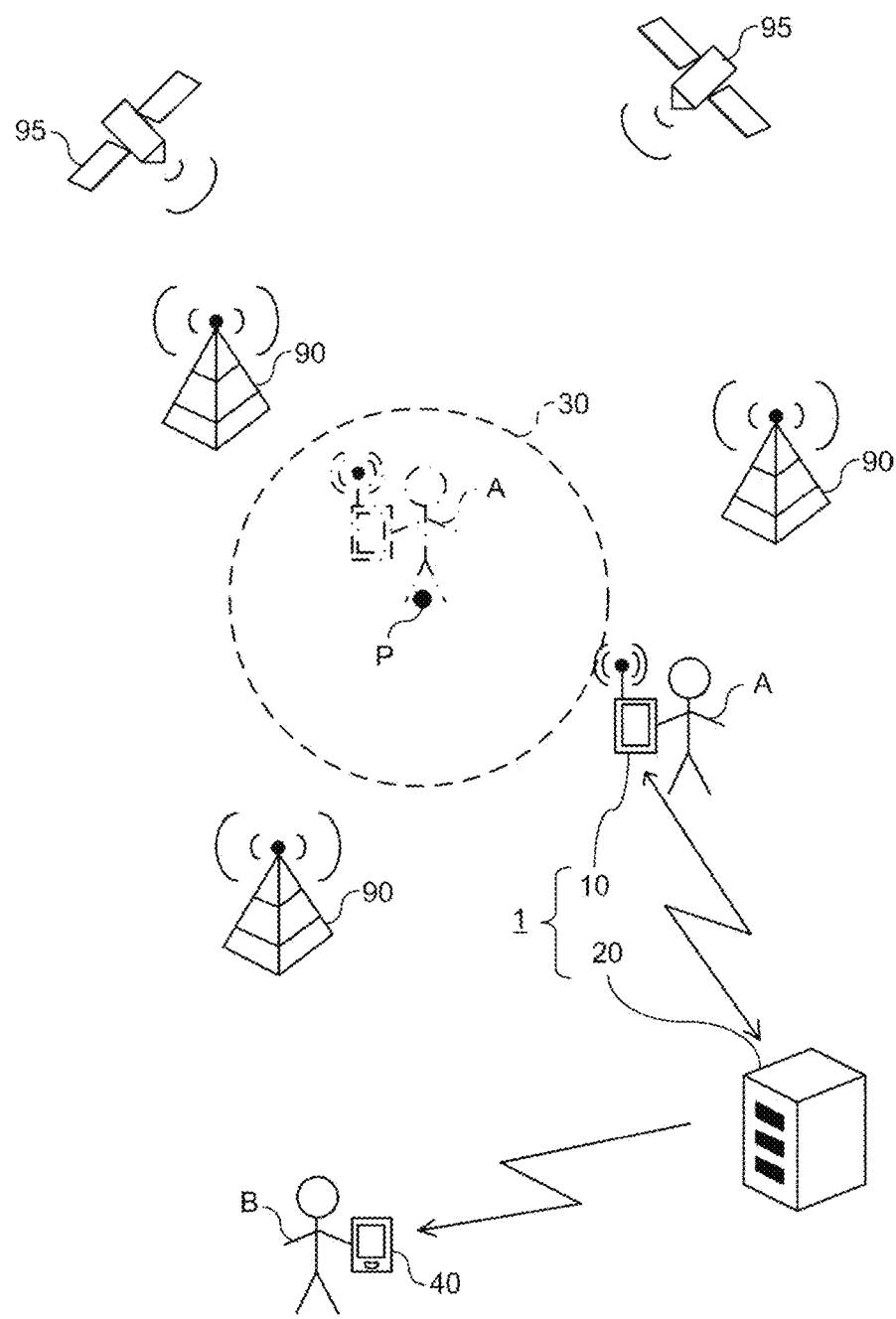
FIG. 1 is a diagram showing a schematic configuration of a position confirmation system of the embodiment.

FIG. 1 is a diagram showing a schematic configuration of a position confirmation system of the embodiment.

A position confirmation system 1 includes a mobile terminal 10 and a position confirmation device 20.

The mobile terminal 10 can receive signals based on at least two modes in a switchable manner, and specify a position based on the received signals. In the embodiment, the mobile terminal 10 can specify a position of itself by a first mode using a LPWA (Low Powder Wide Area) technology and a second mode using a GPS technology. When using the LPWA technology, the mobile terminal 10 receives signals from three base stations 90, and specifies the position from a time difference of reception times of the signals. When using the GPS technology, the mobile terminal 10 receives signals from more than three satellites 95, and specifies the position by distances from each satellite 95. In the embodiment, the mobile terminal 10 is carried by a user A.

The position confirmation device 20 receives the position specified by the mobile terminal 10 from the mobile terminal 10, and confirms a position of the user A. The position confirmation device 20 confirms whether the position of the user A is within a safety range 30, and contacts, if necessary, a user B which is a person which is designated as a guardian or a contact destination of the user A. In the embodiment, the user B has a user terminal 40, and the position confirmation device 20 communicates, if necessary, with the user terminal 40. A specific operation of the position confirmation device 20, such as setting of the safety range 30, is described later.

In addition, the position confirmation device 20 controls switching of whether the mobile terminal 10 receives the signals based on any one of the two modes. Details of the switching operation are also described later.

Next, hardware configurations of the mobile terminal 10 and the position confirmation device 20 are described.

Figure 2:
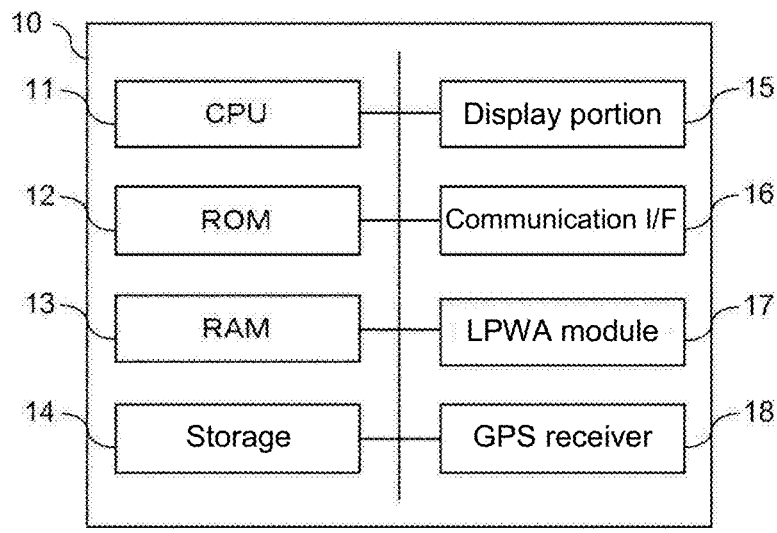
FIG. 2 is a block diagram showing one example of a hardware configuration of a mobile terminal.

FIG. 2 is a block diagram showing one example of a hardware configuration of the mobile terminal.

As shown in FIG. 2, the mobile terminal 10 has a function as a computer, and includes a CPU (Central Processing Unit) 11, a ROM (Read Only Memory) 12, a RAM (Random Access Memory) 13, a storage 14, a display portion 15, a communication interface (I/F: Interface) 16, a LPWA module 17 and a GPS receiver 18. Each configuration is communicably connected with one another through a bus.

The CPU 11 is a central arithmetic processing unit, and conducts various programs or controls each portion. That is, the CPU 11 reads out the programs from the ROM 12 or the storage 14, and executes the programs using the RAM 13 as a workspace. The CPU 11 controls the above-described configurations or carries out various arithmetic processing in accordance with the programs recorded in the ROM 12 or the storage 14. A position specification program, which specifies the position of the mobile terminal 10, is stored in the ROM 12 or the storage 14.

The ROM 12 stores various programs or various data.

The RAM 13 temporarily stores, as the workspace, the programs or the data.

The storage 14 is configured by a HDD (Hard Disk Drive) or a SSD (Solid State Drive), and stores various programs including an operating system, or the various data.

The display portion 15 is, for example, a liquid crystal display, and displays a variety of information. The display portion 15 uses a touch panel method to receive various inputs. In addition to the display portion 15, other input devices such as a pointer device and a keyboard for various inputs may also be connected.

The communication interface 16 is an interface for communicating with other machines such as the position confirmation device 20, and standards such as Ethernet (a registered brand), Fiber Distributed Data Interface (FDDI), Wi-Fi (a registered brand) for example are used.

The LPWA module 17 receives signals based on a LPWA mode from at least three base stations 90, and specifies the position of the mobile terminal 10 from a signal arrival time difference. The LPWA module 17 can use the LPWA mode of any standard. When the position is specified by the LPWA module 17, in a suburb where there are comparably fewer obstacles which reflect or block the signals from the base station 90, a position specification accuracy is, for example, 30 m-50 m. In a city where there are many obstacles, the position specification accuracy is, for example, 150 m-200 m.

The GPS receiver 18 receives signals based on a GPS mode from at least three satellites 95, and specifies the position of the mobile terminal 10 from the signal arrival time difference. When the position is specified by the GPS receiver 18, the position specification accuracy is, for example, 3-10 m. Accordingly, the GPS receiver 18, which uses the GPS mode, can specify the position of the mobile terminal 10 with a higher accuracy than the LPWA module 17 which uses the LPWA mode. On the other hand, power consumption of the GPS receiver 18 which uses the GPS mode is greater than the LPWA module 17 which uses the LPWA mode.

Figure 3:
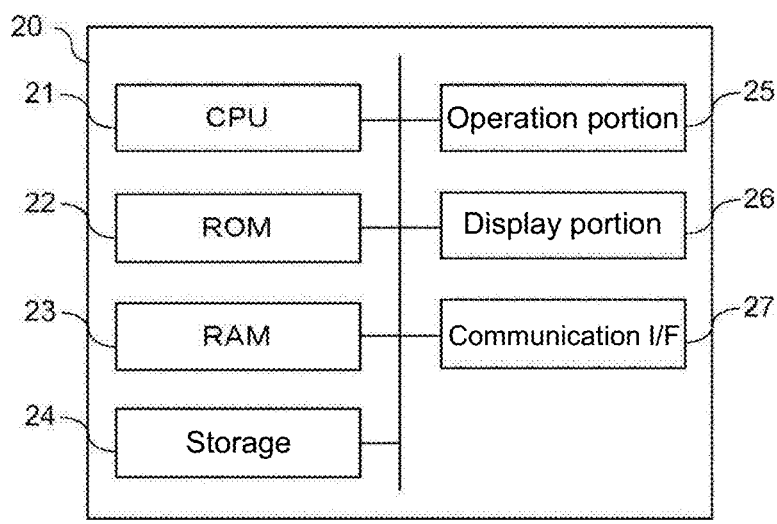
FIG. 3 is a block diagram showing one example of a hardware configuration of a position confirmation device.

FIG. 3 is a block diagram showing one example of a hardware configuration of the position confirmation device.

As shown in FIG. 3, the position confirmation device 20 includes a CPU 21, a ROM 22, a RAM 23, a storage 24, an operation portion 25, a display portion 26 and a communication interface 27. Each configuration is communicably connected with one another through the bus.

The CPU 21 is a central arithmetic processing unit, and executes a variety of programs or controls each portion. That is, the CPU 21 reads out the programs from the ROM 22 or the storage 24, and executes the programs by using the RAM 23 as a workspace. The CPU 21 controls the above-described configurations or executes a variety of arithmetic processing in accordance with the programs recorded in the ROM 22 or the storage 24. A position confirmation program, which confirms the position of the mobile terminal 10, is stored in the ROM 22 or the storage 24.

The ROM 22 stores a variety of programs or a variety of data.

The RAM 23 temporarily stores the programs or the data as the workspace.

The storage 24 is configured by a HDD or a SSD, and stores a variety of programs including an operating system, or a variety of data.

The operation portion 25 includes a pointing device such as a mouse, and a keyboard, and is used to carry out a variety of inputs.

The display portion 26 is, for example, a liquid crystal display, and displays a variety of information. The display portion 26 can also use the touch panel method and function as the operation portion 25.

The communication interface 27 is an interface for communicating with other machines such as the mobile terminal 10 and the user terminal 40, and standards such as Ethernet (a registered brand), FDDI, Wi-Fi (an registered brand) for example are used.

Next, function configurations of the mobile terminal 10 and the position confirmation device 20 are described.

Figure 4:
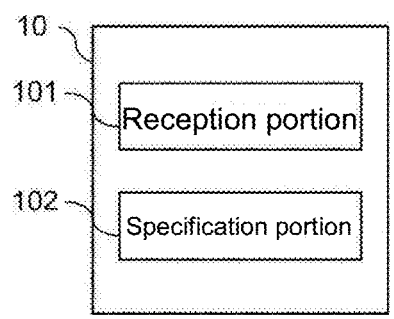
FIG. 4 is a block diagram showing an example of function configurations of a mobile terminal.

FIG. 4 is a block diagram showing an example of function configurations of the mobile terminal.

As shown in FIG. 4, the mobile terminal 10 includes a reception portion 101 and a specification portion 102 as function configurations. Each function configuration is realized by the CPU 11 reading out and executing the position specification program stored in the ROM 12 or the storage 14.

The reception portion 101 receives a switching instruction, which instructs the switching of the LPWA mode (first mode) or the GPS mode (second mode) which specifies the position. The CPU 11 realizes a function as the reception portion 101 by receiving the switching instruction via the communication interface 16. The switching instruction is, as described later, transmitted from the position confirmation device 20.

The specification portion 102 specifies, according to the switching instruction received by the reception portion 101, the position of the mobile terminal 10 by the LPWA mode (first mode) or the GPS mode (second mode). The specification portion 102 specifies, as a default, the position of the mobile terminal 10 by the LPWA mode. Then, when the reception portion 101 receives the switching instruction, the specification portion 102 specifies the position by the GPS mode.

Figure 5:
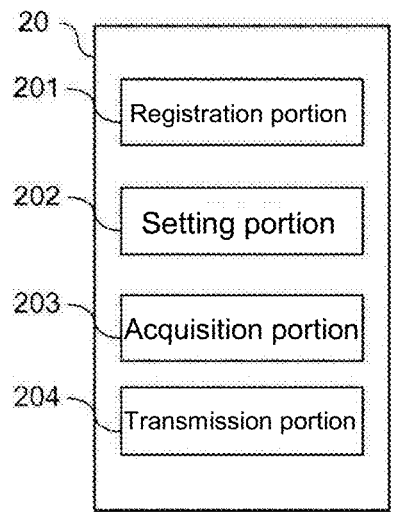
FIG. 5 is a block diagram showing an example of function configurations of a position confirmation device.

FIG. 5 is a block diagram showing an example of function configurations of the position confirmation device 20.

As shown in FIG. 5, the position confirmation device 20 includes a registration portion 201, a setting portion 202, an acquisition portion 203 and a transmission portion 204 as function configurations. Each function configuration is realized by the CPU 21 reading out and executing the position confirmation program stored in the ROM 22 or the storage 24.

The registration portion 201 registers event information including information of a place where the user A conducts an event. The event is, for example, when the user A is an elder, going to a hospital or going for a day care and so on. Elsewise, when the user A is a child, the event is going to school or going for study and so on. When the event includes movement from one place to another, such as a hospital or a school, the event information includes information indicating a movement path as the information of the place where the user A conducts the event.

The setting portion 202 sets the safety range 30, which can be specified as the position of the user A during the event, from the information of the place where the event is conducted and the position specification accuracy of the LPWA mode. That is, as shown in FIG. 1, the setting portion 202 sets a range, which is enlarged by a magnitude of the position specification accuracy of the LPWA mode (for example, 50 m in the suburb) from a place P where the event is conducted, as the safety range 30. Therefore, during the event, even if the position of the mobile terminal 10 specified by the LPWA mode is shifted from the place where the event is conducted, if the position of the mobile terminal 10 is within the safety range 30, it can be confirmed as an error range caused by the accuracy. When the event information includes the movement path, the range, in which the movement path is enlarged by the magnitude of the specification accuracy, is set as the safety range 30. The detail is described later.

The acquisition portion 203 acquires position information, which relates to the position of the mobile terminal 10 specified by the mobile terminal 10 carried by the user A.

When the position which is shown by the position information acquired from the mobile terminal 10 is out of the safety range 30 set by the setting portion 202, the transmission portion 204 transmits a switching instruction, which instructs the switching from the LPWA mode to the GPS mode, to the mobile terminal 10. In addition, when the position which is shown by the position information acquired from the mobile terminal 10 is out of the safety range 30 set by the setting portion 202, the transmission portion 204 transmits the information that the user A deviates from the safety range 30 to a contact destination of the user B which is pre-registered.

Next, transmission and reception of the data between the mobile terminal 10 and the position confirmation device 20 of the position confirmation system 1 is described.

Figure 6:
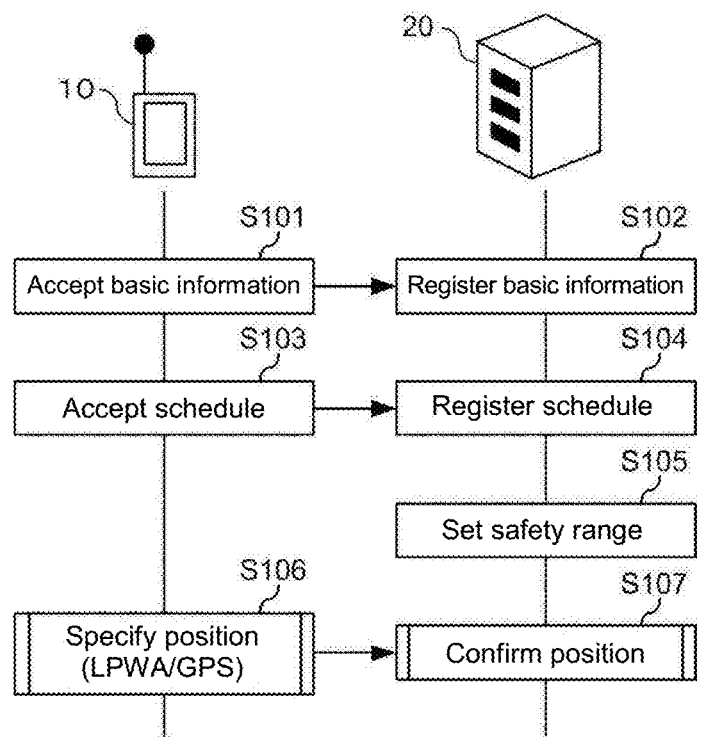
FIG. 6 is a sequence diagram of one example of a flow of a position confirmation in a position confirmation system.
Figure 9:
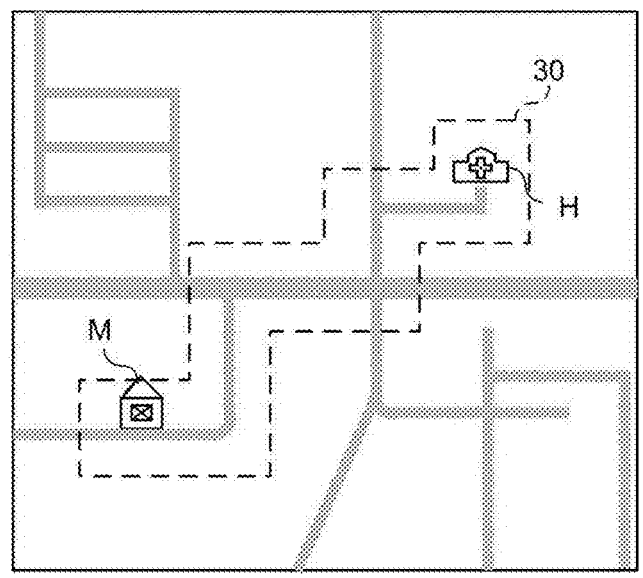
FIG. 9 is a diagram showing one example of a screen indicating a safety range during an event.

FIG. 6 is a sequence diagram of one example of a flow of the position confirmation in the position confirmation system. FIG. 7 is a diagram showing one example of an input screen of the basic information. FIG. 8 is a diagram showing one example of an input screen of the event. FIG. 9 is a diagram showing one example of a screen indicating the safety range during the event.

The mobile terminal 10 accepts the inputs of basic information by the user A (step S101). An acceptation of the basic information is carried out in the screen as shown in FIG. 7 for example. As shown in FIG. 7, the information of the user A, who is a target of the position confirmation, is input as personal information. The input information includes name, age, address, and telephone number of the user A. Furthermore, the information of the user B, who confirms the position of the user A, is input as guardian information. The input information includes name, age, address, telephone number and E-mail address of the user B. The E-mail address is a contact destination to which the information that the user A deviates from the safety range 30 is transmitted. Furthermore, addresses of each facility of the basic movement place of the user A can also be registered. In the example shown in FIG. 7, in addition to home, addresses of a hospital and a day care centre can also be registered. Each facility is denoted with an attribute of "city" or "suburb" based on the addresses. A denotation of the attribute can be input manually or be denoted automatically based on the addresses.

Returning to FIG. 6, the position confirmation device 20 registers the basic information accepted in step S101 (step S102). The steps till now are the preparation in advance, and the following steps are a specific flow of the position confirmation method.

The mobile terminal 10 accepts a schedule (step S103). An acceptation of the schedule is carried out in the screen shown in FIG. 8 for example. As shown in FIG. 8, the schedule is input daily for example, and includes one or multiple events. An illustrated first event is going to a hospital, which is carried out between home and A Hospital from 9 o'clock to 11 o'clock. A means of movement at the time of going to the hospital is set as on foot. In addition, the second event is the day care, which is carried out between home and B Centre from 12 o'clock to 18 o'clock. A means of movement at the time of the day care is set as by car.

Returning to FIG. 6, the position confirmation device 20 registers the schedule accepted in step S103 (step S104).

The position confirmation device 20 sets the safety range of each event based on the registered schedule and stores the safety range of each event in the storage 24 (step S105). Specifically, the position confirmation device 20 specifies the place where the user A may exist to conduct the event. For example, at the time of the event of going to a hospital as shown in FIG. 7, the place where the user A may exist is home, the path from home to A Hospital, and A Hospital. Therefore, the position confirmation device 20 sets the safety range, which is based on the position specification accuracy of the LPWA mode, respectively for home, the path from home to A Hospital, and A Hospital. Conceptually, as shown in FIG. 9, the safety range 30 which surrounds the path from home M to A Hospital H is set. Therefore, according to the position specification accuracy of the LPWA mode (for example 50 m), even when there is an error of 50 m between the actual position of the user A and the position specified in the LPWA mode by the mobile terminal 10, if the user A is on the path between home M and A Hospital H, the position of the user A does not deviate from the safety range 30. Furthermore, in the example shown in FIG. 9, because home M and A Hospital H are positioned in the "suburb", and the path on the way is also in the "suburb", a safety range with a radius of 50 m is set. However, when a city is included in the places where the event is conducted or in the path, because the position specification accuracy of the LPWA mode for the place in the city is reduced, the safety range is set to be greater. For example, for the place in the city, a safety range with a radius of 150 m-200 m is set.

Returning to FIG. 6, the mobile terminal 10 specifies the position of the mobile terminal 10 by the LPWA mode or the GPS mode, and transmits the position of the mobile terminal 10 to the position confirmation device 20 (step S106). As described above, the mobile terminal 10 specifies the position by the LPWA mode by default. When receiving a switching instruction from the position confirmation device 20, the mobile terminal 10 is switched to the GPS mode. A detailed flow of a position specification process of the mobile terminal 10 is described later with reference to FIG. 10.

The position confirmation device 20 receives the position information from the mobile terminal 10, and monitors whether the user A deviates from the safety range in the event based on the safety range 30 set for each event in the schedule (step S107). A detailed flow of a position confirmation process of the position confirmation device 20 is described below with reference to FIG. 11.

Figure 10:
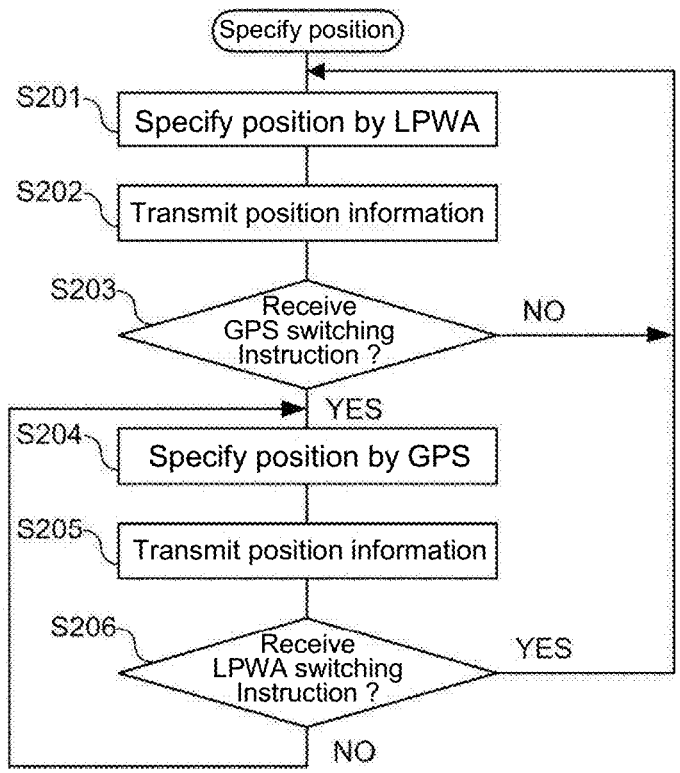
FIG. 10 is a flowchart showing one example of a flow of a position specification process of a mobile terminal.

FIG. 10 is a flowchart showing one example of the flow of the position specification process of the mobile terminal. The position specification process is realized by the CPU 11 reading out and executing the position specification program stored in the ROM 12 or the storage 14.

The CPU 11 receives the signals based on the LPWA mode from the base station 90, and specifies the position of the mobile terminal 10 (step S201). Then, the CPU 11 transmits the position information indicating the specified position to the position confirmation device 20 (step S202).

The CPU 11 determines whether the switching instruction, which instructs receiving the signals based on the GPS mode, is received from the position confirmation device 20 (step S203). When the switching instruction is not received (step S203: NO), because the position is continuously specified by the LPWA mode, the CPU 11 returns to the process of step S201.

When receiving the switching instruction (step S203: YES), the CPU 11 stops receiving the signals based on the LPWA mode, receives the signals based on the GPS mode from the satellite 95, and specifies the position of the mobile terminal 10 (step S204). Then, the CPU 11 transmits the position information, which indicates the specified position, to the position confirmation device 20 (step S205).

The CPU 11 determines whether the switching instruction, which instructs receiving the signals based on the LPWA mode, is received from the position confirmation device 20 (step S206). When the switching instruction is not received (step S206: NO), because the position is continuously specified by the GPS mode, the CPU 11 returns to the process of step S204.

When receiving the switching instruction (step S206: YES), the CPU 11 stops receiving the signals based on the GPS mode, returns to step S201, and receives the signals based on the LPWA mode from the base station 90.

As described above, the mobile terminal 10 specifies the position of itself by the LPWA mode until the switching instruction, which instructs receiving the signals based on the GPS mode, is received, and after that, every time a switching instruction is received, the mobile terminal 10 is switched to the GPS mode or the LPWA mode to receive the signals. When the LPWA mode is used, the position specification accuracy is lower than the GPS mode, but the position can be specified by low power consumption. Conversely, when the GPS mode is used, the power consumption is greater than the LPWA mode, but the position can be specified by a high position specification accuracy.

Figure 11:
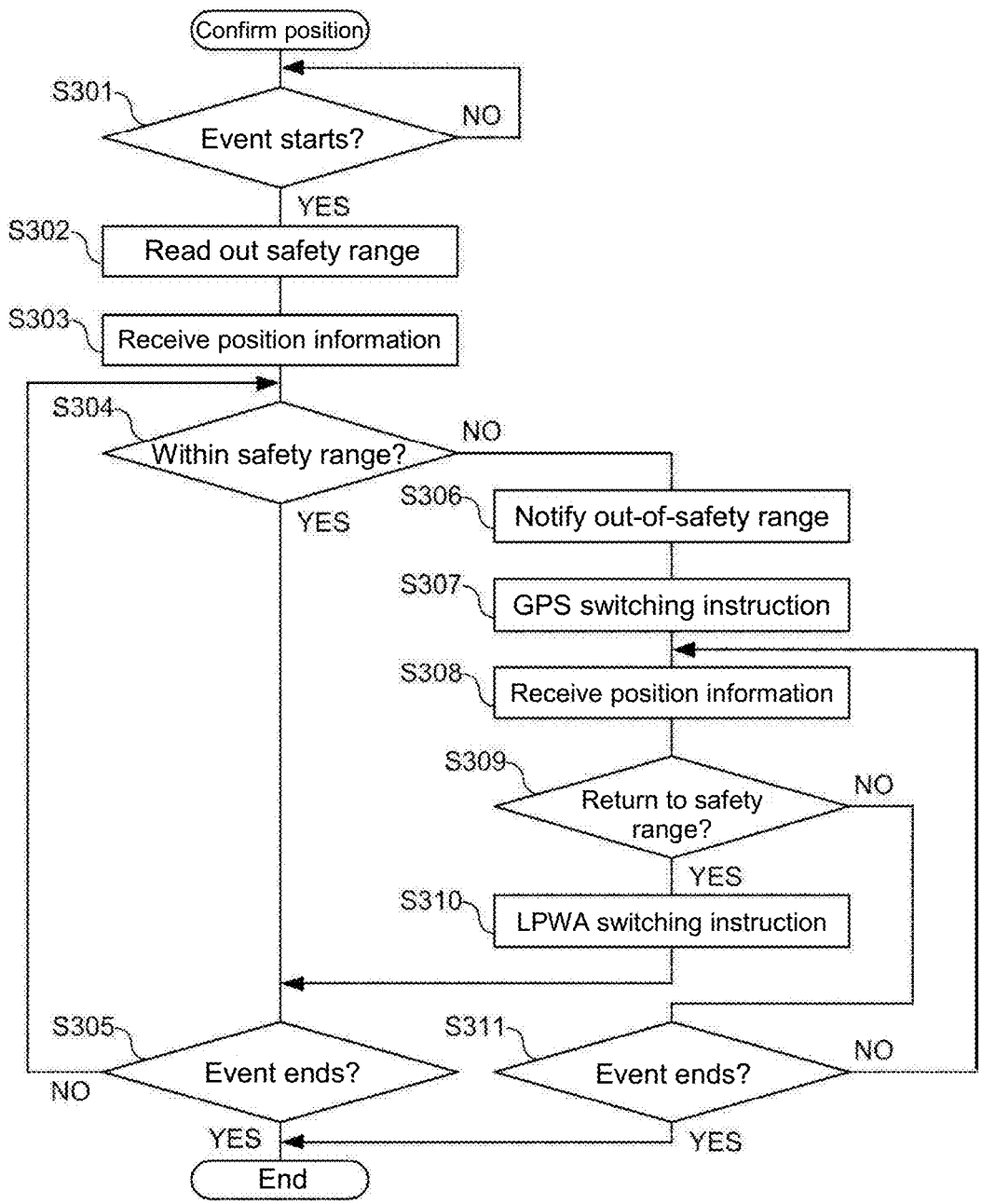
FIG. 11 is a flowchart showing one example of a flow of a position confirmation process of a position confirmation device.
Figure 12:
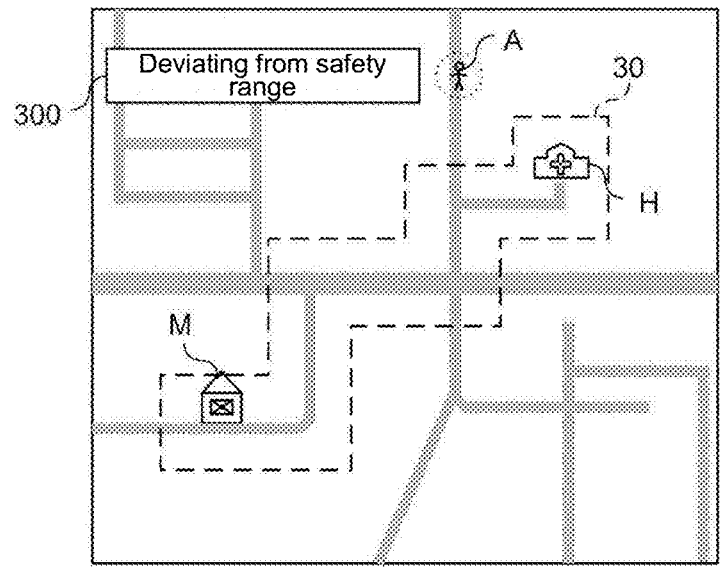
FIG. 12 is a diagram showing one example of a screen showing how a user deviates from a safety range.

FIG. 11 is a flowchart showing one example of a flow of the position confirmation process of the position confirmation device. The position confirmation process is realized by the CPU 21 reading out and executing the position confirmation program stored in the ROM 22 or the storage 24. FIG. 12 is a diagram showing one example of a screen showing how a user deviates from a safety range.

The CPU 21 confirms the schedule registered in the above step S104, and confirms whether it is a start time of any event in the schedule (step S301). When it is not the start time of the event (step S301: NO), the CPU 21 waits until the start time of the event.

When it is the start time of the event (step S301: YES), the CPU 21 reads out the safety range set in the above step S105 for the event to be started from the storage 24 and so on (step S302).

The CPU 21 receives the position information from the mobile terminal 10 (step S303), and determines whether the position based on the position information is within the safety range (step S304). When the position is within the safety range (step S304: YES), the CPU 21 confirms whether it is an end time of the event (step S305). When it is not the end time of the event (step S305: NO), the CPU 21 returns to the process of step S304. When it is the end time of the event (step S305: YES), the CPU 21 ends the position confirmation process.

On the other hand, when the position based on the position information is not within the safety range (step S304: NO), the CPU 21 notifies the user B that the user A deviates from the safety range (step S306). The notification to the user B is carried out to an address which is pre-input as the basic information shown in FIG. 7. For example, a message indicating that the user A deviates from the safety range is sent to an E-mail address of the user B. The user B can confirm the message from the position confirmation device 20 in the user terminal 40. In the message, a URL (Uniform Resource Locator) for accessing the storage 24 of the position confirmation device 20 is added, by accessing the URL by the user B, for example, the screen shown in FIG. 12 may be displayed on the user terminal 40. Therefore, a current position of the user A can be confirmed on a map, and the degree of the deviation from the safety range can also be confirmed. In the screen, the position of the user A is shown by an icon; furthermore, an alarm message 300, such as "deviating from the safety range" and so on can also be displayed.

The CPU 21 further transmits the switching instruction, which instructs receiving the signals based on the GPS mode, to the mobile terminal 10 (step S307). The CPU 21 receives the position information from the mobile terminal 10 (step S308).

The CPU 21 determines whether the position indicated by the received position information returns to the safety range (step S309). When the position returns to the safety range (step S309: YES), the CPU 21 transmits the switching instruction, which instructs receiving the signals based on the LPWA mode, to the mobile terminal 10 (step S310). Then, the CPU 21 proceeds to the process of step S305.

On the other hand, when the position of the user A does not return to the safety range (step S309: NO), the CPU 21 confirms whether it is the end time of the event (step S311). When it is not the end time of the event (step S311: NO), the CPU 21 returns to the process of step S308. When it is the end time of the event (step S311: YES), the CPU 21 ends the position confirmation process.

According to the position confirmation system 1 of the first embodiment as described above, compared with an occasion that the position is specified only by the GPS receiver 18, the LPWA module 17 and the GPS receiver 18 are switched to be used, and accordingly the power consumption can be reduced and the position can also be specified.

Particularly, according to the position confirmation system 1 of the first embodiment, the safety range is be set for each event. Even when there is a mistake in the position specification based on the position specification accuracy of the LPWA mode, if the safety range is within the specification accuracy, the user A can be confirmed to be in a place where the event is conducted. Therefore, the LPWA mode is not immoderately switched to the GPS mode with a high accuracy and great power consumption. On the other hand, when an abnormal position of the user A is specified even with consideration of the position specification accuracy of the LPWA mode, the LPWA mode is switched to the GPS mode, and thus the position of the user A can be more accurately confirmed, and a correspondence thereafter becomes easy.

In addition, when the user A deviates from the safety range, the user B can be notified of the deviation, so that the user B which is the guardian can immediately perceive an abnormality of the user A.

Furthermore, in the embodiment, an occasion that the acceptance of the basic information of step S101 and the acceptance of the schedule of step S103 are carried out in the mobile terminal 10 is described. The schedule can be registered by the user A himself, or by the user B such as the guardian and so on. Elsewise, by registering keywords and so on in the mobile terminal 10 in advance, an event associated with the keywords can also be registered as the schedule. For example, when the user A is interested in "Gogh", if a keyword called "Gogh" is registered, a schedule of a painting exhibition of impressionism, which will be held in the suburbs, may be automatically registered.

In addition, the acceptance of the basic information of the step S101 and the acceptance of the schedule of step S103 can also be executed directly in the position confirmation device 20 instead of the mobile terminal 10. For example, the user A or the user B can also access the position confirmation device 20, and input the basic information and the schedule directly. Elsewise, the acceptance of the basic information and the acceptance of the schedule can also be carried out in the user terminal 40 of the user B.

In addition, in the embodiment, the safety range is not particularly associated with the means of movement of each event (for example, on foot, by car or the like). However, the safety range can also be set with consideration of the means of movement. For example, when the means of movement is on foot, it is also considered that the user A may inadvertently pass a predefined path while thinking. Nevertheless, if it is a place visited frequently, the user A notices that immediately and returns to the predefined path. Assuming such a situation, when the means of movement is on foot, the safety range may be further expanded from the range based on the position specification accuracy of the LPWA mode. In addition, when the means of movement is by car or train, it is considered that the user A takes transportation facility such as a bus or a train. On this occasion, the user A does not deviate from the predefined path, so that the safety range is not changed from the range based on the position specification accuracy of the LPWA mode. Furthermore, even if the means of movement is not input at the time of a schedule input as shown in FIG. 8, the means of movement can also be automatically specified, for example, by an acceleration sensor or a geomagnetic sensor using a technology of Japanese Patent Application Laid-open No. 2014-66638. On this occasion, in the mobile terminal 10, the means of movement of the user A is specified by the acceleration sensor or the geomagnetic sensor, and the information indicating the means of movement is transmitted to the position confirmation device 20. The position confirmation device 20 can correct the safety range based on the information indicating the received means of movement.

In addition, in the embodiment, only a planar position is considered about. However, for example, an atmospheric pressure sensor may be provided in the mobile terminal 10, and an elevation position of the user A is detected based on the atmospheric pressure sensor and transmitted to the position confirmation device 20. In high buildings such as a mansion, the user A may actually deviate from the safety range even when the user A seems to be within the safety range in a plane. Even in such an occasion, if the elevation position is detected by the atmospheric pressure sensor, the deviation from the safety range for the elevation position can be confirmed and reported to the user B.

In addition, in the embodiment, an occasion that the GPS mode is used as the second mode is described, but the present disclosure is not limited thereto. The GPS mode is one example of a GNSS (Global Navigation Satellite System), and any satellite positioning system, such as GLONASS (Global Navigation Satellite System), Galileo, Quasi-Zenith Satellite System (QZSS) and so on, can also be used.

Second Embodiment

In the first embodiment, an example of using the position specification of two modes, the LPWA mode and the GPS mode, is described. In the second embodiment, an example of using the position specification of three or more modes is described. In the second embodiment, a mode, which uses the acceleration sensor provided on the mobile terminal 10, is added to the LPWA mode and the GPS mode to specify the position by three position specification modes. Besides, the position specification mode is used in a stepwise manner from the one with a lower accuracy to the one with a higher accuracy. It is described more specifically below.

Figure 13:
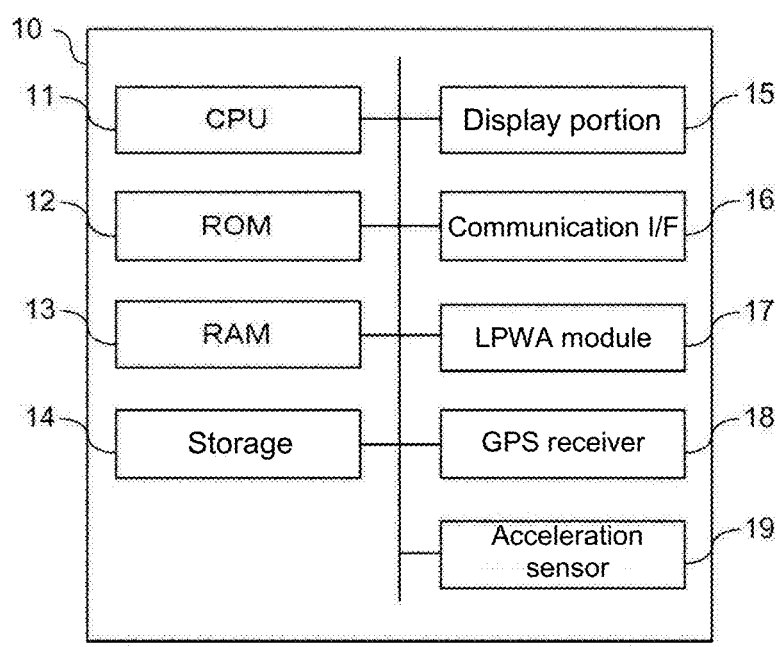
FIG. 13 is a diagram showing one example of a hardware configuration of a mobile terminal of a second embodiment.
Figure 14:
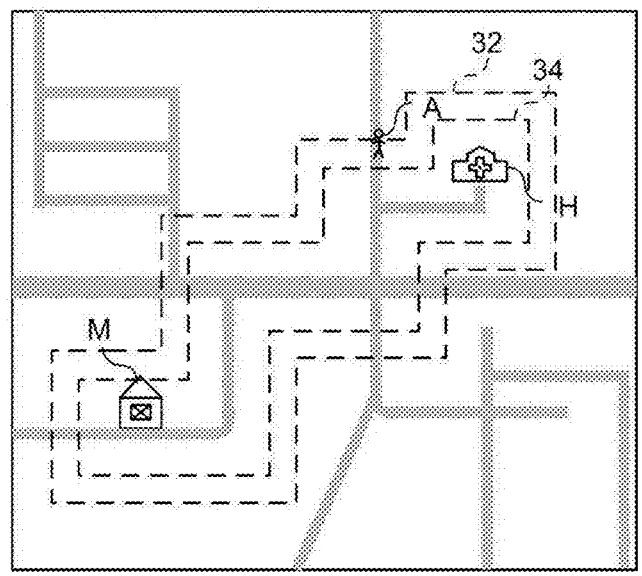
FIG. 14 is a diagram showing one example of how a gradual safety range is set.

FIG. 13 is a diagram showing one example of a hardware configuration of the mobile terminal of a second embodiment. FIG. 14 is a diagram showing one example of how a stepwise safety range is set.

As shown in FIG. 13, the mobile terminal 10 of the second embodiment has an acceleration sensor 19 in addition to the configuration shown in FIG. 2. Configurations other than the acceleration sensor 19 are the same as those of the first embodiment, so the description thereof is omitted.

The acceleration sensor 19 detects a movement of the mobile terminal 10. The CPU 11 can specify the position of the mobile terminal 10 by setting the position specified by the LPWA module 17 or the GPS receiver 18 as a starting point and accumulating the position detected by the acceleration sensor 19. The mode using the acceleration sensor 19 is simply called an acceleration sensor mode hereinafter. In the acceleration sensor mode, because the detection result of the acceleration sensor 19 is accumulated, an error becomes greater. Therefore, the position specification accuracy of the acceleration sensor mode is lower than the LPWA mode and the GPS mode. On the other hand, if the acceleration sensor mode is used, because it is not necessary to receive the signals from the base station 90 or the satellite 95, the power consumption is less than the LPWA mode.

In the second embodiment, the above-mentioned three position specification modes may be used, and the modes specifying the position can be switched in an order from the one with a lower position specification accuracy to the one with a higher position specification accuracy, that is, from the one with a lower power consumption to the one with a greater power consumption. From the lower position specification accuracy to the higher position specification accuracy, the modes specifying the position can be switched in an order of the acceleration sensor mode, the LPWA mode and the GPS mode.

On this occasion, for example, as shown in FIG. 14, a dual safety range of a first safety range 32 and a second safety range 34 can be set. The first safety range 32 is set based on the position specification accuracy of the acceleration sensor mode. The second safety range 34 is set based on the position specification accuracy of the LPWA mode. Because the position specification accuracy of the acceleration sensor mode is lower, the first safety range 32 is set to be greater than the second safety range 34.

The position confirmation device 20 receives, by default, position information indicating a position specified by the acceleration sensor mode from the mobile terminal 10. When the position indicated in the position information deviates from the first safety range 32, the position confirmation device 20 transmits the switching instruction to the mobile terminal 10 so as to switch to the position specification of the LPWA mode. At the same time, the mobile terminal 10 specifies the position by the LPWA mode, and transmits the position information to the position confirmation device 20. By instructing switching from the acceleration sensor mode to the LPWA mode, the position confirmation device 20 can confirm a more accurate position of the mobile terminal 10 (the position of the user A), and more accurately determine whether the user A is in the place where the event is conducted. When the position indicated in the position information further deviates from the second safety range 34, the position confirmation device 20 transmits the switching instruction to the mobile terminal 10 to switch to the position specification of the GPS mode.

By confirming the more accurate position of the user A in the stepwise manner in this way, whether the user A leaves from the place where the event is conducted is confirmed at an extremely low power consumption, and once it is found that the user A has left, the position of the user A can be accurately confirmed.

Furthermore, in the embodiment, an example using three position specification modes is described, but the present disclosure is not limited thereto, and four or more position specification modes can also be used.

In addition, in the embodiment, by specifying the position by the acceleration sensor mode for the first safety range 32, and specifying the position by the LPWA mode for the second safety range 34, the accuracy is improved stepwise while the power consumption is increased. However, the power consumption and the accuracy can also be increased stepwise even if the position specification mode is not changed. For example, the same LPWA mode is used, and a position specification interval is set longer for the first safety range 32 than for the second safety range 34, that is, the number of times that the LPWA module 17 communicates with the base station 90 per unit time is reduced. In this way, because the number of times that the LPWA module 17 communicates with the base station 90 when the user A is within the first safety range 32 is comparably reduced, the power consumption is reduced, and the accuracy of the position specification becomes lower. If the user A deviates from the safety range 32, the number of times that the LPWA module 17 communicates with the base station 90 can be increased, the accuracy can be higher, and the power consumption can be greater. Even in the GPS mode or the acceleration sensor mode, a position specification using stepwise power consumption can be applied in a stepwise safety range by changing the position specification interval.

Third Embodiment

In the first embodiment and the second embodiment, the mobile terminal 10 and the position confirmation device 20 are respectively provided independently. In the third embodiment, functions of the mobile terminal 10 and the position confirmation device 20 are integrated into one mobile terminal 50. Even in an integration occasion, the hardware configurations are the same as the mobile terminal 10 shown in FIG. 2. However, the function configurations are different.

Figure 15:
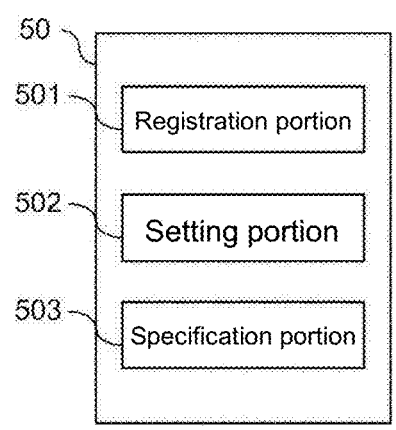
FIG. 15 is a diagram showing an example of function configurations of a mobile terminal of a third embodiment.

FIG. 15 is a diagram showing an example of function configurations of the mobile terminal of the third embodiment.

As shown in FIG. 15, the mobile terminal 50 of the third embodiment includes a registration portion 501, a setting portion 502 and a specification portion 503 as function configurations. Each function configuration is realized by the CPU 11 reading out and executing the position confirmation program stored in the ROM 12 or the storage 14.

The registration portion 501 registers the event information which includes the information of the place where the user conducts the event. The registration portion 501 achieves the same function as the registration portion 201 of the position confirmation device 20 in the first embodiment.

The setting portion 502 sets the safety range 30, which can be specified as the position of the user A during the event, from the information of the place where the event is conducted and the position specification accuracy of the LPWA mode. The setting portion 502 achieves the same function as the setting portion 202 of the position confirmation device 20 in the first embodiment.

The specification portion 503 specifies a position of itself by the LPWA mode (the first mode), or the GPS mode (the second mode) that specifies the position by a greater power consumption and a higher accuracy than the first mode. When the position specified by the LPWA mode is within the safety range 30 set by the setting portion 502, the specification portion 503 continues to specify the position by the LPWA mode, and when the specified position is out of the safety range 30, the specification portion 503 specifies the position by the GPS mode.

If the function configurations above are compared with the function configurations of the mobile terminal 10 shown in FIG. 4 and the function configurations of the position confirmation device 20 shown in FIG. 5, it can be known that the reception portion 101, the acquisition portion 203, and the transmission portion 204 are not needed. The reason is that according to the mobile terminal 50 of the third embodiment, the transmission and reception of the instruction and the acquisition of the position information are not needed.

Therefore, according to the third embodiment, the mobile terminal 50 has more functions than the mobile terminal 10 of the first embodiment does. However, compared by the functions of the entire position confirmation system 1, the reception portion 101, the acquisition portion 203, and the transmission portion 204 can be omitted, and the functions can be simplified. Therefore, for example, the power consumption of the entire system can be reduced, and the cost of the entire system can be reduced.

Furthermore, in each embodiment, the position specification process and the position confirmation process conducted by the CPU reading out and executing the software (programs) can also be conducted by a variety of processors besides the CPU. The processors on this occasion may be a PLD (Programmable Logic Device) such as a FPGA (Field-Programmable Gate Array) which can change the circuit configuration after production, or dedicated electric circuits such as an ASIC (Application Specific Integrated Circuit), which are processors having a circuit configuration designed to be dedicated to conduct specific processes. In addition, the position specification process and the position confirmation process may be conducted by one of the various processors, or by a combination of two or more processors of the same kind or different kinds (for example, a combination of multiple FPGAs, a combination of the CPU and the FPGA, and so on). In addition, the hardware configurations of the various processors are more specifically an electric circuit combining circuit elements such as semiconductor elements and so on.

In addition, in each embodiment, aspects in which the programs of the position specification process and the position confirmation process are stored (installed) in the storage 14 and the storage 24 in advance are described, but the present disclosure is not limited thereto. The programs can also be provided in a form of being recorded in a record medium, such as a CD-ROM (Compact Disk Read Only Memory), a DVD-ROM (Digital Versatile Disk Read Only Memory), and a USB (Universal Serial Bus) memory and so on. In addition, the programs can also be in a form of being downloaded through network from external devices.

The position specification program of the present disclosure makes a computer conduct: a reception process of receiving a switching instruction instructing a switching of a first mode or a second mode, wherein the first mode is for specifying a position, and the second mode is for specifying the position by a greater power consumption and a higher accuracy than the first mode; and a specification process of specifying a position of itself by the first mode or the second mode according to the switching instruction received in the reception process.

The position confirmation program of the present disclosure makes a computer conduct: a registration process of registering event information including information of a place where an event is conducted; a setting process of setting a safety range capable of being specified as a position of a user during the event from the information of the place and a position specification accuracy of a first mode for specifying the position; an acquisition process of acquiring position information relating to a position of the mobile terminal, wherein the position is specified with the first mode by the mobile terminal carried by the user; and a transmission process of transmitting a switching instruction to the mobile terminal when the position indicated by the position information deviates from the safety range set in the setting process, wherein the switching instruction instructs a switching to a second mode for specifying the position by a greater power consumption and a higher accuracy than the first mode.

The position confirmation program of the present disclosure makes a computer conduct: a registration process of registering event information comprising information of a place where an event is conducted; a setting process of setting a safety range capable of being specified as a position of a user during the event from the information of the place and a specification accuracy of the position specified by the first mode for specifying the position; and a specification process of a specification portion specifying a position of itself by the first mode or a second mode that specifies the position by a greater power consumption and a higher accuracy than the first mode, continuing to specify the position by the first mode when the position specified by the first mode is within the safety range set by the setting process, and specifying the position by the second mode when the specified position deviates from the safety range.

The position specification method of the present disclosure includes: a reception process of receiving a switching instruction instructing a switching of a first mode or a second mode, wherein the first mode is for specifying a position, and the second mode is for specifying the position by a greater power consumption and a higher accuracy than the first mode; and a specification process of specifying a position of itself by the first mode or the second mode according to the switching instruction received in the reception process.

The position confirmation method of the present disclosure includes: a registration process of registering event information comprising information of a place where an event is conducted; a setting process of setting a safety range capable of being specified as a position of a user during the event from the information of the place and a position specification accuracy of the first mode for specifying the position; an acquisition process of acquiring a position information relating to a position of the mobile terminal, wherein the position is specified with the first mode by the mobile terminal carried by the user; and a transmission process of transmitting a switching instruction to the mobile terminal when the position indicated by the position information deviates from the safety range set in the setting process, wherein the switching instruction instructs a switching to a second mode for specifying the position by a greater power consumption and a higher accuracy than the first mode.

The position confirmation method of the present disclosure includes: a registration process of registering event information comprising information of a place where an event is conducted; a setting process of setting a safety range capable of being specified as a position of a user during the event from the information of the place and a position specification accuracy of a first mode for specifying the position; and a specification process of a specification portion specifying a position of itself by the first mode or a second mode that specifies the position by a greater power consumption and a higher accuracy than the first mode, continuing to specify the position by the first mode when the position specified by the first mode is within the safety range set by the setting process, and specifying the position by the second mode when the specified position deviates from the safety range.

What is claimed is:

1. A mobile terminal, comprising:
a processor, being configured to:
receive a switching instruction instructing a switching to a first modes a second mode or a third mode from a position confirmation device, wherein the first mode is for specifying a position of the mobile terminal, and the second mode is for specifying the position by a greater power consumption and a higher accuracy than the first mode, and the third mode is for specifying the position by a less power consumption and a lower accuracy than the first mode, wherein the switching instruction is instructed by the position confirmation device based on information relating to the position of the mobile terminal specified by the first mode, the second mode or the third mode, wherein a first safety range is set based on a position specification accuracy of the third mode and a second safety range is set based on a position specification accuracy of the first mode, the position of the mobile terminal specified by the first mode or the second mode is specified as a starting point and accumulated by the position of the mobile terminal specified by the third mode, when the position of the mobile terminal specified by the third mode deviates from the first safety range, the switching instruction instructing the switching to the first mode is instructed by the position confirmation device, and when the position of the mobile terminal specified by the first mode deviates from the second safety range, the switching instruction instructing the switching to the second mode is instructed by the position confirmation device;

specify the position of the mobile terminal by the first mode, the second mode or the third mode according to the received switching instruction, and wherein the processor stops specifying the position by a mode used when receiving the switching instruction in either the first mode, the second mode or the third mode, and specifies the position by another different mode.

2. The mobile terminal according to claim 1, further comprising:
a transmission portion, which wherein the processor further transmits information related to the position specified by the first mod; the second mode or the third mode to the position confirmation device.

3. A position confirmation system, comprising:
A mobile terminal, comprising,
a first processor, being configured to:
receive a switching instruction instructing a switching to a first mode, a second mode or a third mode, wherein the first mode is for specifying a position of the mobile terminal, and the second mode is for specifying the position by a greater power consumption and a higher accuracy than the first mode, and the third mode is for specifying the position by a less power consumption and a lower accuracy than the first mode;

specify the position of the mobile terminal by the first mode, the second mode or the third mode according to the received switching instruction, and wherein the first processor stops specifying the position by a mode used when receiving the switching instruction in either the first mode, the second mode or the third mode, and specifies the position by another different mode; and a position confirmation device, wherein the position confirmation device comprising:
a second processor, being configured to:
acquire position information relating to the position of the mobile terminal, wherein the position is specified by the mobile terminal 4 Customer No: 31561 US-786 application Ser No: 16/158,306 carried by a user; and transmit the switching instruction to the mobile terminal based on the position information, wherein the switching instruction instructs a switching to the first mode, the second mode or the third mode for specifying the position, wherein the second processor is further configured to:

set a first safety range based on a position specification accuracy of the third mode and set a second safety range based on a position specification accuracy of the first mode;

specify the position of the mobile terminal specified by the first mode or the second mode as a starting point and accumulate the specified position by the position of the mobile terminal specified by the third mode;

when the position of the mobile terminal specified by the third mode deviates from the first safety range, transmit the switching instruction instructing the switching to the first mode to the mobile terminal; and when the position of the mobile terminal specified by the first mode deviates from the second safety range, transmit the switching instruction instructing the switching to the second mode to the mobile terminal.

* * * * *